United States Patent
Clark et al.

(10) Patent No.: US 7,121,310 B2
(45) Date of Patent: Oct. 17, 2006

(54) UNDERWATER PILE CUTTING APPARATUS AND METHOD OF USE

(76) Inventors: Wilbur L. Clark, 26202 SE. 383$^{nd}$, Enumclaw, WA (US) 98022; Michael T. Clark, 1254 Mc Hugh Ave., Enumclaw, WA (US) 98022; Keith Cronin, P.O. Box 26, Lake Bay, WA (US) 98349

( * ) Notice: Subject to any disclaimer, the term of this patent is extended or adjusted under 35 U.S.C. 154(b) by 87 days.

(21) Appl. No.: 10/837,945

(22) Filed: May 3, 2004

(65) Prior Publication Data
US 2004/0216570 A1   Nov. 4, 2004

Related U.S. Application Data

(60) Provisional application No. 60/467,333, filed on May 2, 2003.

(51) Int. Cl.
*B27M 3/00* (2006.01)
(52) U.S. Cl. ............... 144/24.12; 144/34.1; 144/34.5; 83/151; 83/567; 83/743; 30/92; 405/191
(58) Field of Classification Search ............... 144/34.1, 144/34.5, 24.12, 334, 335, 339; 83/151, 83/563, 613, 743, 399, 928; 30/241, 92; 405/191
See application file for complete search history.

(56) References Cited

U.S. PATENT DOCUMENTS

| 31,481 | A | | 2/1861 | Scofield |
| 2,707,008 | A | | 4/1955 | Bannister ................... 144/309 |
| 3,056,267 | A | * | 10/1962 | McRee ....................... 405/191 |
| 3,270,787 | A | | 9/1966 | Rehnstrom ................... 144/34 |
| 3,493,020 | A | * | 2/1970 | Choat ........................ 144/34.1 |
| 3,595,286 | A | * | 7/1971 | Coffey ....................... 144/34.1 |
| 3,638,693 | A | | 2/1972 | Sundberg ................... 144/3 D |
| 3,667,515 | A | * | 6/1972 | Corey ........................ 83/743 |
| 3,835,901 | A | * | 9/1974 | Jonsson .................... 144/34.1 |
| 4,106,537 | A | * | 8/1978 | Saikku ....................... 144/34.5 |
| 4,168,729 | A | | 9/1979 | Tausig et al. ............. 144/34 E |
| 4,261,399 | A | | 4/1981 | Hawkins et al. .......... 144/34 E |
| 4,537,236 | A | | 8/1985 | Kulju ......................... 144/336 |
| 4,799,829 | A | | 1/1989 | Kenny ....................... 405/195 |
| 5,289,816 | A | | 3/1994 | Rakowski ................. 125/23.01 |
| 5,318,081 | A | * | 6/1994 | Parkhurst ................. 144/24.13 |
| 5,509,453 | A | * | 4/1996 | Crockett .................... 144/34.1 |
| 5,735,323 | A | * | 4/1998 | Maloch ..................... 144/34.1 |
| 6,024,145 | A | * | 2/2000 | Ackles ........................ 144/382 |

* cited by examiner

*Primary Examiner*—Bena Miller
(74) *Attorney, Agent, or Firm*—Garrison & Associates PS; David L. Garrison

(57) ABSTRACT

An apparatus for cutting wooden piles underwater and a method of use are disclosed. The apparatus has a frame and brace configured for engaging a pile. A pressure medium activated cutting device is connected to the frame and oriented at an angle such that a pile can be cut at a point below the bottom surface. The frame and brace are placed on opposite sides of the pile and connected to each other with a chain or cable. The apparatus has lines attached thereto and the other ends of the lines are attached to a boat or other flotation device. Using the disclosed apparatus to remove pilings causes significantly less turbidity than devices or methods currently available. Additionally, using the disclosed device also eliminates the need to decontaminate silt removed from the water using the currently available methods or devices.

11 Claims, 3 Drawing Sheets

UNDERWATER PILE CUTTING APPARATUS AND METHOD OF USE

CROSS REFERRENCE TO RELATED APPLICATION

This application claims priority from U.S. Provisional Patent Application No. 60/467,333, entitled "UNDERWATER PILE CUTTING APPARATUS," filed on May 2, 2003

FIELD OF INVENTION

The disclosure herein relates to pile cutters and more particularly to an apparatus for cutting piles underwater and a method of using the apparatus.

BACKGROUND OF THE INVENTION

Underwater removal of wooden piles has always been a difficult problem in waterfront maintenance and clearance projects. Typical pile removal methods are time consuming, hazardous, and often require large support equipment. Removal of wooden piles from waterfront structures during demolition or repair is normally accomplished by one of two methods. The first method is to remove the pile by pulling on it with a heavy crane. This is done by either using the crane to extract the pile completely, or pulling the pile from side-to-side until it breaks off at the mud line. This method limits the operation to work locations accessible by crane.

The second method is to physically cut the pile off at the mud line. Blasting, sawing, and shearing are common techniques used for cutting.

Shear type cutters typically operate by sliding two blades together in either a sliding guillotine motion or scissors type motion. The shear type cutter has several distinct advantages over blasting or the chain and reciprocating saws: since there are no high speed rotating or reciprocating blades, the shear type cutter is safer to operate.

A number of devices have been patented which relate to the problem of cutting elongated devices such as trees or piles in underwater environments. For example, U.S. Pat. No. 3,667,515, issued to Corey, discloses an apparatus that has a base with a guide adapted for receiving a pile, the base being adapted for reciprocal movement with respect to the pile, connectors affixed to the base for suspending the base in a substantially horizontal plane, a blade having a pair of opposite extremities, one of the extremities being pivotably mounted to the base, an actuator having a fixed member and a movable member, the fixed member being pivoted to the base and the movable member being pivotably mounted to the other extremity of the blade, the blade being swept across the guide when the actuator is engaged and being retracted away from the guide when the actuator is disengaged. When the pile cutter is lowered to the base of a pile, the guide being positioned about the pile for restricting the lateral movement of the base with respect to the pile, the actuator is engaged causing the blade to shear the pile at its base.

U.S. Pat. No. 2,707,008, entitled "Tree-Handling Method And Airborne Apparatus," issued to Bannister, provides a gear-driven, cable operated device for cutting trees in remote locations. U.S. Pat. No. 3,056,267, issued to McRee, discloses of a dragline operated device and a method for removing from submerged sites portions of piles previously driven at their lower end into the water bed and having cap ends exposed above the water line. A frame is used that can be laterally shifted to a position poised above the pile with an opening through the frame in alignment with the cap of the pile. The frame is then lowered, making the frame captive to the pile. The frame is then guided to the mud line and the pile is severed at the mud line.

A forest harvester is the subject of U.S. Pat. No. 3,638,693. The machine described in that patent is intended for separating standing trees. The apparatus is a wheeled A-frame type device that supports an open-ended gripping member.

In U.S. Pat. No. RE 31,481, an apparatus is disclosed having an elongated frame including tree clamping jaws supported at one end and a shear-type cutting blade supported from the frame for movement therealong between an inactive position remote from the jaws and an active position cooperative with the jaws to shear a tree member clampingly engaged by the jaws.

A grab-type tree harvester is the subject of U.S. Pat. No. 4,537,236, which discloses the use of a pair of open-ended jaws to clamp the tree. A frame is connected to a lifting means through a rotating means in a manner such that the frame is adapted to rotate about a substantially vertical axis. The frame comprises grab means which are selectively moved by actuation means to an opened or closed position. Roller means for pulling a felled tree through the grab means is provided and at least one means for pruning a felled tree is also disclosed.

A hydraulically operated device for cutting trees, logs and the like is the subject of U.S. Pat. No. 3,270,787. That apparatus shows a hydraulic linked arm supported by a tractor with a pair of open-ended jaws at the distal end of the linkage.

While the devices identified above, and other devices in the prior art, work adequately to cut piles or trees at or above the bottom of a body of water, many water quality regulations now require that wooden piles be removed from at least the first two feet below the bottom of the water body. This is generally accomplished by removing the mud and silt from around the pile with some type of suction device and cutting the pile with a chain saw. Generally, the use suction device causes a significant increase in the turbidity of the water around the pile by stirring up the loose silt on the bottom, and the use of a chain saw causes saw dust particles to be released in the water body. Additionally, the material removed from around the pile is often contaminated with industrial chemicals and it either must be decontaminated before disposal or disposed in a facility licensed to accept contaminated material. For the purpose of this application, the bottom surface of any body of water will be referred to as the "mud line" throughout this document.

Therefore, there is a need for a device or apparatus that will allow wooden piles to be removed underwater, wherein such piles are removed beneath the mud line. Such a device that could remove piles without a significant increase in water turbidity and without necessitating the removal of mud or silt would be a substantial improvement over the prior art.

DISCLOSURE OF THE INVENTION

Therefore, it is an object of the disclosure herein to provide an apparatus for underwater pile cutting, wherein the piles are cut below the mud line.

Another object of the disclosure herein is to provide an apparatus for underwater pile cutting that will not cause a significant increase in water turbidity.

A further object of the disclosure herein is to provide such an apparatus that does not require removal of mud and silt before the pile is cut.

Yet another object of the disclosure herein is to provide such an apparatus that can be used around a dock or pier with relative ease.

An additional object of the disclosure herein is to provide a method of use for such an apparatus.

Disclosed herein is an apparatus that meets the objects above and others as will become readily apparent and a method of use for the apparatus. The apparatus is comprised of a frame that is configured to engage one side of a pile, a brace that is configured to engage another side of a pile, and a pressure medium actuated cutting device.

The cutting device is mounted on the frame such that it is oriented at an oblique angle to the pile. Thus, if the cutting device is actuated while the frame is engaged with a pile and resting on the bottom surface of a body of water, the pile will be cut at a point below the bottom surface (also referred to herein as the mud line) of the body of water.

In one embodiment, the cutting device is hydraulically activated and the hydraulic fluid is pumped to the cutting device through hoses that run between the cutting device and a pump connected to a fluid reservoir that is above the surface of the water. In other embodiments, the cutting device can be pneumatically activated.

The frame and brace can be connected to each other and held onto the pile by a chain or cable that is routed through a plurality of elbow brackets on the brace and over the frame thereby keeping the apparatus firmly engaged with the pile.

In use, the apparatus is lowered into the water by ropes or cables which are attached to a float or to a boat. A diver, or divers, places the frame and the brace against a pile and ensures that the frame and brace are resting on the mud line. The frame and brace are then tightly connected with a cable or chain such that they are firmly secured to the pile. The pile can be secured such that it can be controlled after it is cut.

Once the apparatus is engaged with the pile, the divers move a safe distance away and the cutting device is activated. The cutting blade extends downward at an angle through the material below the mud line and cuts the pile well below the mud line. The pile cutting apparatus is removed from the pile, and the pile is removed from the water and disposed of according to the applicable environmental regulations.

BRIEF DESCRIPTION OF THE DRAWINGS

The objects and features of the present invention, which are believed to be novel, are set forth in the appended claims. The present invention, both as to its organization and manner of operation, together with further objects and advantages, may best be understood by reference to the following descriptions, taken in conjunction with the accompanying drawings, wherein:

BEST MODE OF CARRYING OUT THE INVENTION

Figure 1:
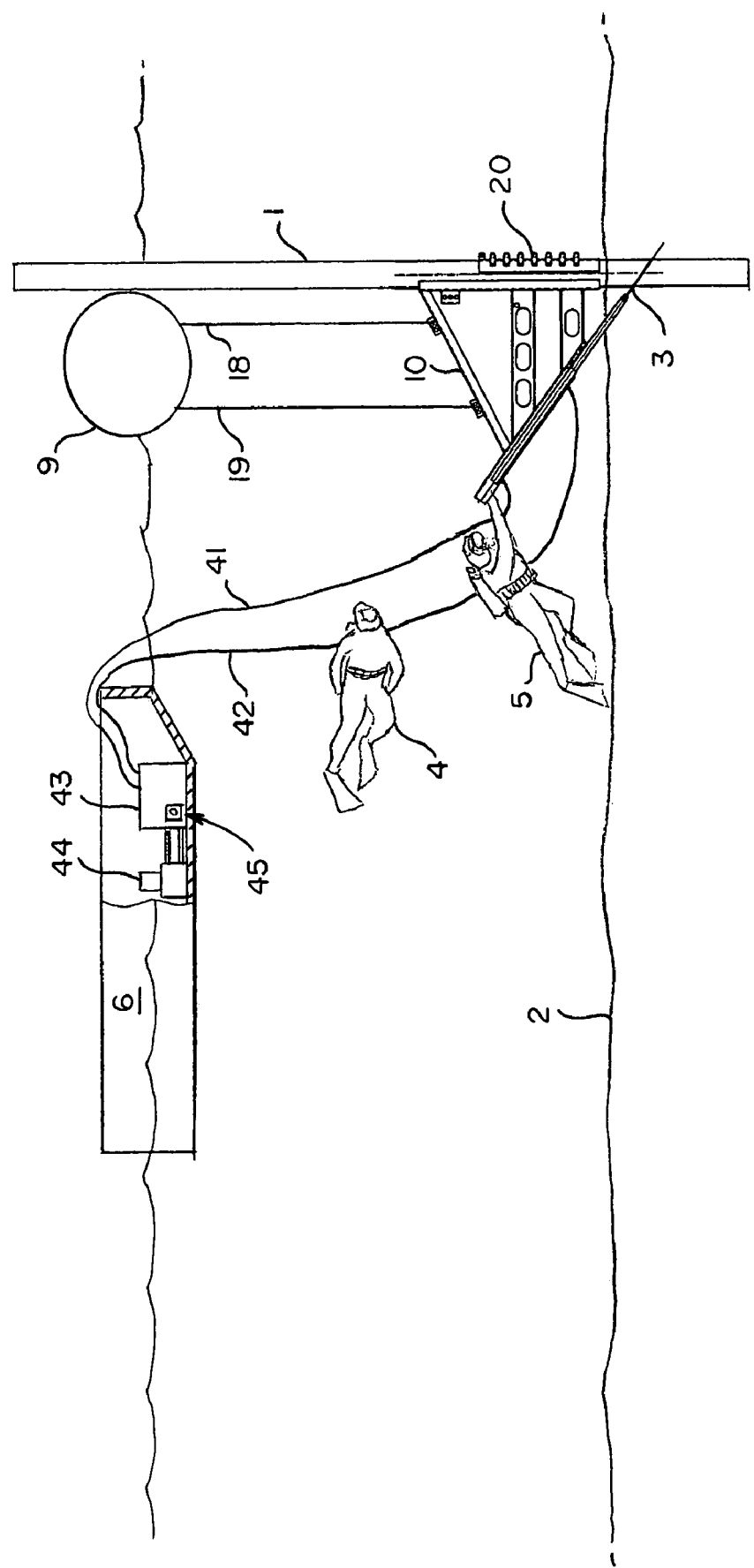
FIG. 1 shows the apparatus disclosed herein engaging and cutting a wooden pile after placement by divers.

Turning now to the drawings, the pile cutting apparatus will be described in preferred embodiments by reference to the numerals of the drawing figures wherein like numbers indicate like parts.

Figure 2:
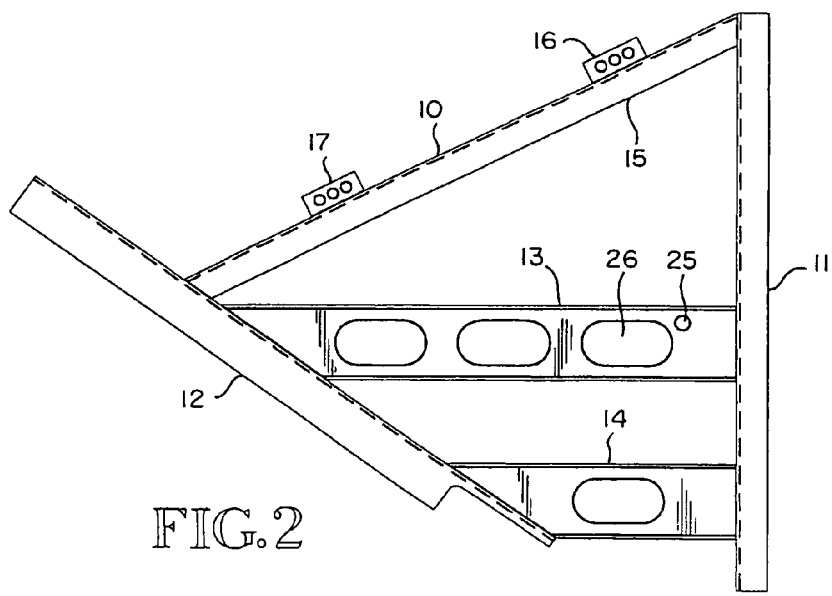
FIG. 2 is a side elevation of the frame of the apparatus disclosed herein.

FIG. 2 shows one preferred embodiment of the frame 10 for the apparatus disclosed herein. The outer perimeter of the embodiment depicted in the figure is comprised of a pile engaging member 11, a first horizontal support member 14, a cutting device mounting member 12, and a diagonal support member 15. A second horizontal support member 13 extends from the pile-engaging member 11 to the cutting device mounting member 12.

Both the first horizontal support member 14 and the second horizontal support member 13 have a plurality of openings (shown generally as 26) that communicate through the members. The openings in the horizontal support members can be used by divers as a place to grasp the frame when it is being positioned to engage a pile. Additionally, the second horizontal support member has a smaller opening 25 that communicates through the member. A pair of connection flanges 17 and 18 are located on the diagonal support member 15.

Figure 3:
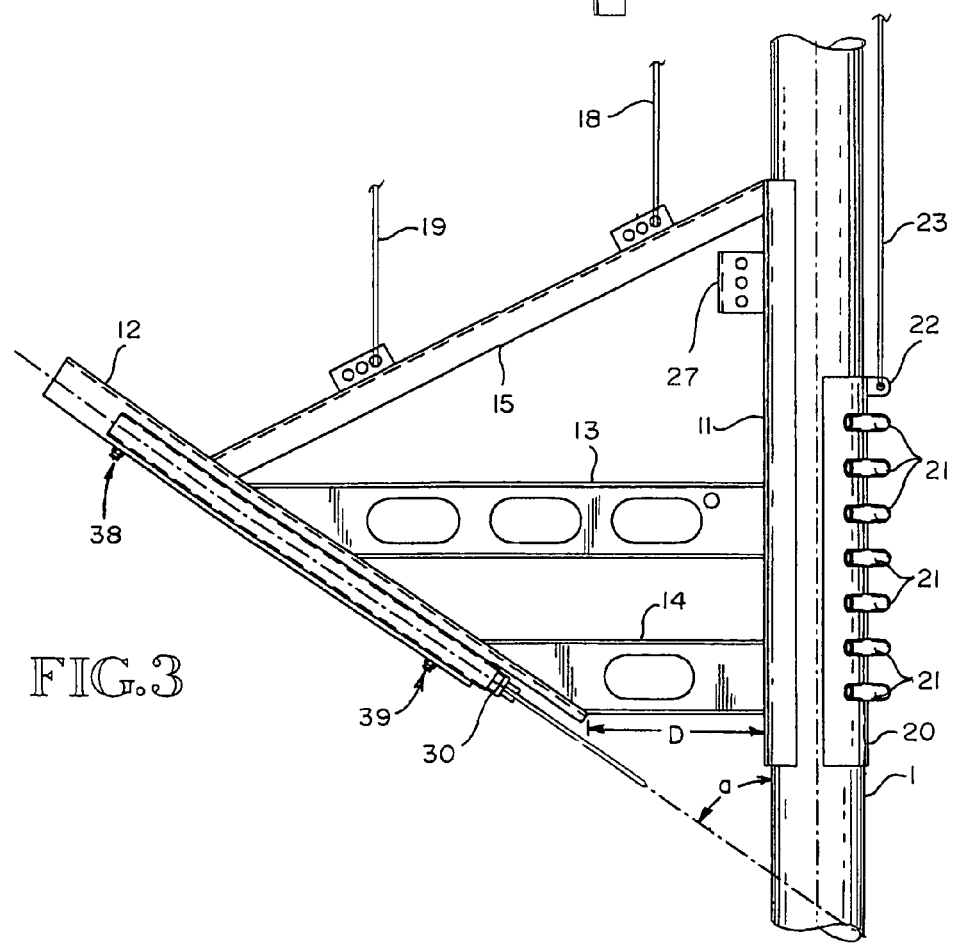
FIG. 3 is a side elevation of the apparatus disclosed herein wherein the apparatus is engaging a wooden pile and the cutting blade has not been extended.

FIG. 3 shows one preferred embodiment of the frame 10 and pile brace 20 engaged with a pile 1. The pile-engaging member 11, of the frame, has a concave surface for engaging the pile such that the apparatus can fit snugly against the pile. The brace 20 also has a concave surface for engaging the pile. A plurality of connecting brackets 21 are spaced along the outer surface of the brace 20, and a connection flange 22 is located at the upper end of the brace.

The embodiment of the frame depicted in FIG. 3 includes an additional connection flange 27 that is attached to the pile-engaging member. The frame and brace are lowered into position by ropes or cables 18, 19 & 23, which are connected to the frame and brace at the connection flanges. The other end of the ropes or cables can be connected to a flotation device, a boat on the surface of the body of water, or other suitable device.

The pressure medium actuated cutting device 30 is attached to the cutting device mounting member 12. As can be seen in the figures, the mounting member 12 is generally oriented such that when the cutting device is actuated, the cutting device will engage the pile at a point below the apparatus and the pile will be cut at an angle.

The size of various embodiments of the device, and the dimensions of the members of those embodiments, can vary based on the size of the piles being cut and the desired depth of the cut below the mud line. In one preferred embodiment, the length of the pile engaging member 11 is six feet six inches long, the cutting device mounting member is seven feet long, the distance (D) along the bottom first horizontal support member is one foot eleven and one half inches, the angle between the pile and the cutting blade is fifty five degrees, and the angle between the diagonal support member 15 and the pile engaging member is sixty three degrees. In this preferred embodiment, the pile is cut at about two feet below the mud line.

Figure 4:
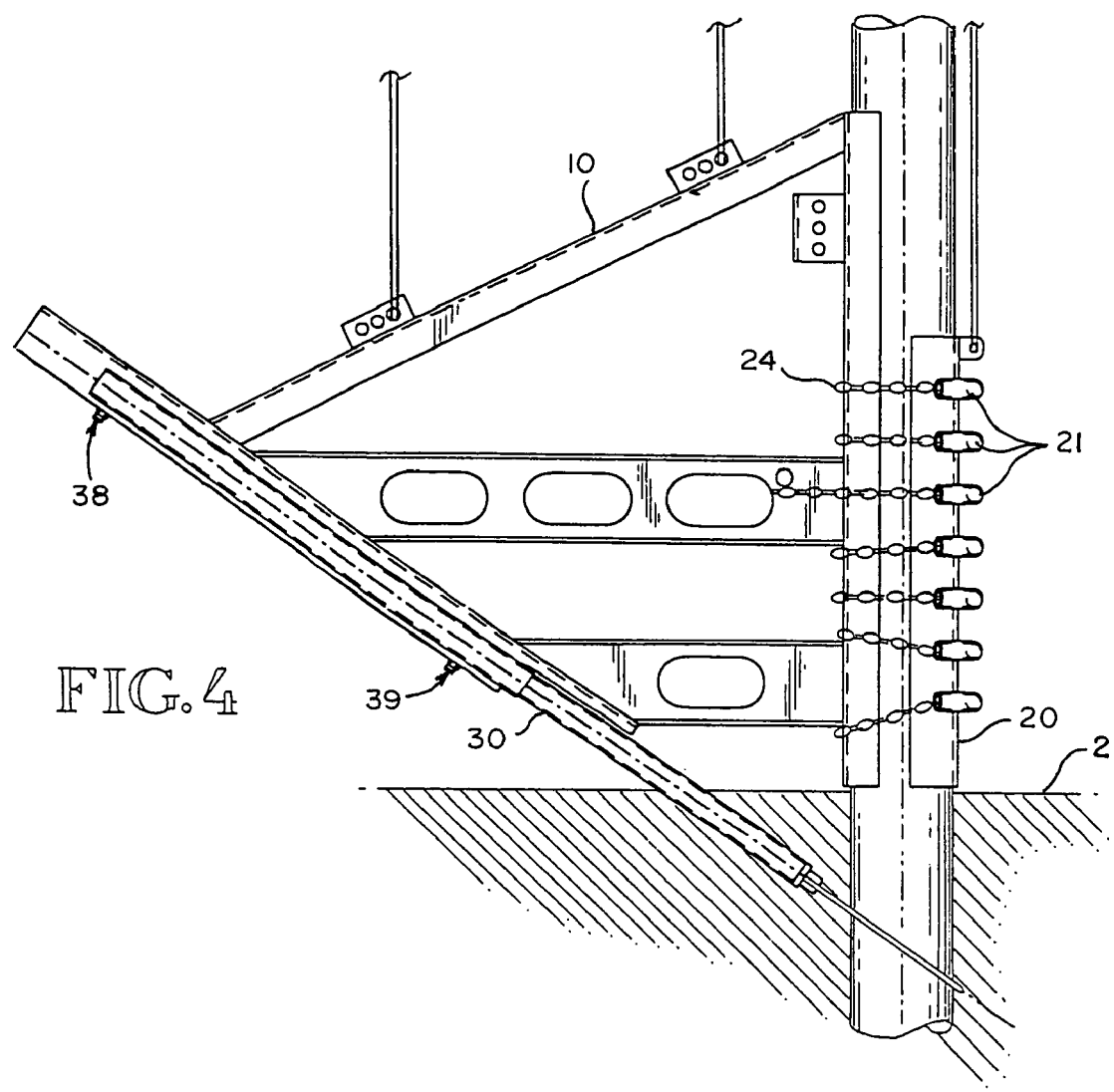
FIG. 4 is a side elevation of the apparatus disclosed herein wherein the apparatus is engaging a wooden pile and the cutting blade is extended to cut the pile below the mud line.

FIG. 4 shows a preferred embodiment of the apparatus disclosed herein engaged with and cutting a pile according to the teachings herein. The frame 10 and the brace 20 are resting on the bottom/mud line 2 of a body of water, and are connected to each other by a chain 24 such that they are securely connected to the pile. The chain is routed through the connecting brackets 21 on the brace and over the pile-engaging member of the frame. In the embodiment depicted, the connecting brackets 21 are elbow shaped tubular members that are evenly dispersed along the exterior surface of the brace.

A pressure medium actuated cutting device 30 is mounted on the cutting device mounting member. When the frame is engaging a pile, the cutting device is oriented at an angle to the pile such that it will cut the pile at a location below the mud line. In one preferred embodiment, the cutting device engages the pile at a distance of at least two feet below the mud line. In the embodiment depicted, the pressure medium used for activating the cutting device is hydraulic fluid supplied from a pump via hoses that are connected to the cutting device at connection points 38 & 39.

Figure 5:
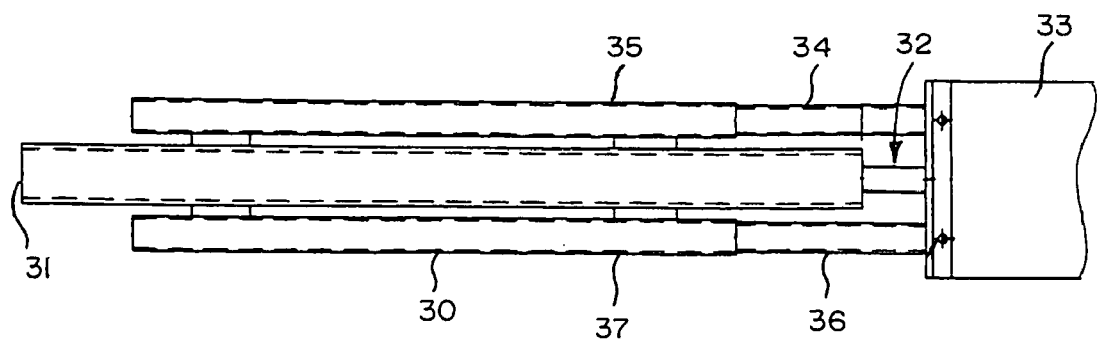
FIG. 5 is a plan view of the cutting device used on the apparatus described herein.

FIG. 5 shows a preferred embodiment of the cutting device disclosed herein. In one preferred embodiment, the cutting device 30 is a hydraulic ram cylinder that has a cylinder housing 31, with the ram cylinder 32 extending therefrom. A cutting blade 33 is connected to the end of the cylinder, and a pair of guides 34 & 36 are attached to the cutting blade. The guides 34 & 36 are housed in guide sleeves/housings 35 & 37, which are attached to the sides of the cutting device. The guides and guide housings help to ensure that the blade maintains its proper orientation to the pile when the cutting device is actuated.

The cutting device is actuated by forcing the pressure medium into the cylinder housing from the hose connected to the rearmost hose connection point 38. This causes the cylinder 32 to extend from the cylinder housing and forces the cutting blade 33 downward and through the pile. Once the pile is cut, the pressure in the hose connected to connection point 38 is reduced and the pressure in the hose connected to connection point 39 is increased, thereby causing the cylinder to be withdrawn into the cylinder housing.

Referring now to FIG. 1, the figure shows the apparatus disclosed herein attached to a pile 1. The frame 10 and the brace 20 are resting on the mud line 2 at the bottom of a body of water. The frame is connected to a flotation device 9 on the surface via cables 18 & 19 such that divers 4 & 5 can easily maneuver the frame into position for connection to the pile. The pressure medium is supplied to the cutting device via hoses 41 & 42 from a pump 43 in a boat 6. The pump 43 is connected to a pressure medium reservoir 44, and it is activated by a switch 45. When the cutting device is actuated, the blade extends at a downward angle through the material on the bottom of the body of water such that the pile is cut below the mud line.

To use the apparatus disclosed herein, the apparatus would be lowered into a body of water, and moved to a pile that has been selected for cutting. The apparatus is then securely connected to the pile by routing a chain around the pile engaging member of the frame and the brace, which are placed on opposite sides of the pile.

If the cutter is not connected to a pump for supplying the pressure medium, it is connected after the apparatus is connected to the pile. In some embodiments of the apparatus, the cutter can be actuated from above and below the water, but it can always be actuated from at least above the water. The cutter is then actuated and the pile is cut. Some means for controlling the pile can be connected to the pile before cutting to prevent the pile from falling, floating away, or moving such that equipment is damaged after the pile is cut.

After the pile is cut, the cutting device is manipulated such that it is in the same position that it was in before the cut and the apparatus is then disengaged from the pile. The apparatus can then be placed on another pile for cutting, or it can be removed from the body of water.

INDUSTRIAL APPLICABILITY

The invention has applicability to the field of devices for cutting piles and trees. In particular, the present invention describes a pressure medium activated shear type pile cutter. Provided herein is an apparatus for underwater pile cutting, wherein the piles are cut below the mud line without significantly increasing the turbidity of the water around the pile. The apparatus can be easily put into engagement with a pile by divers and no mud or silt needs to be removed from around a pile to use the apparatus. The apparatus disclosed herein can be used in difficult to reach locations under and around docks and piers, and it is relatively less expensive to remove piles using the apparatus disclosed herein compared to devices in the prior art.

In compliance with the statute, the invention has been described in language more or less specific as to structural features. It is to be understood, however, that the invention is not limited to the specific features shown or described, since the means and construction shown or described comprise preferred forms of putting the invention into effect. Additionally, while this invention is described in terms of being used for pile cutting, it will be readily apparent to those skilled in the art that the invention can be adapted to other uses as well. The invention is, therefore, claimed in any of its forms or modifications within the legitimate and valid scope of the appended claims, appropriately interpreted in accordance with the doctrine of equivalents.

What is claimed is:

1. An apparatus for cutting wooden piles, comprising:
   a frame that is configured for engaging a pile;
      the frame having a plurality of attachment plates configured for attachment of lowering means to the frame such that the frame can be lowered into a body of water;
   a brace that is configured for engaging a pile;
      the brace having an attachment plate configured for attachment of lowering means to the brace such that the brace can be lowered into a body of water;
   means for connecting the frame to the brace;
   a cutting device mounted on the frame
      the cutting device being a pressure medium-actuated cylinder with a reciprocating cutting rod extending therefrom
      the cutting device having a pair of guide housings that are attached to the cutting device such that the housings are on opposite sides of the cylinder;
      each guide housing having a guide rod extending therefrom;
      the cutting device further having a cutting blade that is attached to the end of the cutting rod and the guide rods;
      the cutting rod being axially displaceable from a first position to a second position whereby the cutting device is mounted on the frame at an angle such that when the frame is placed on one side of a pile, the brace is placed on the opposite side of a pile, the brace and the frame are connected such that the apparatus is secured to the pile, the frame and the brace are resting on the bottom surface of a body of water, and the cutting device is actuated, the cutting rod is displaced from the first position to the second position, the cutting blade moves through the material surrounding the pile and cuts through the pile at a point below the bottom surface; and the cutting rod can then be reciprocated to the first position.

2. The apparatus of claim 1 wherein the brace further includes a plurality of guides that are configured for ensuring proper placement of the means for connecting the frame to the brace.

3. The apparatus of claim 1 wherein the means for connecting the frame to the brace is a chain, and the apparatus is connected to the pile by placing the frame and brace on opposite sides of the pile and routing the chain around the pile such that it is routed over the frame and the brace, and the ends of the chain are connected to the apparatus.

4. The apparatus of claim 1 wherein the pressure medium for the cutting device is supplied via conduits that communicate between the cutting device and a pump, and the means for causing the cutting device to be actuated is operable from at least above the surface of a body of water.

5. The apparatus of claim 4 wherein the pressure medium for actuating the cutting device is hydraulic fluid.

6. The apparatus of claim 1 wherein the lowering means are a plurality of lines attached to the frame and the brace, and the end of the lowering means that is not attached to the frame or the brace is secured to a buoyant object.

7. The method for cutting a wooden pile positioned in and extending upwardly from the bottom surface of a body of water comprising the steps of:

selecting a pile to be cut;

selecting an apparatus for cutting wooden piles, the apparatus having a frame that is configured for connection to a pile; the frame having a cutting device attached thereto such that when the frame is connected to a pile, the cutting device is oriented at a downward oblique angle relative to the pile; means for connecting the frame to a pile; and means for actuating the cutting device;

lowering said frame in said body of water into contact with said piling securing the apparatus to the pile with a brace having an attachment plate configured for attachment to said pile; and actuating the cutting device, said cutting device mounted for reciprocal movement of a cutting blade, said blade cutting said pile below the bottom surface of said body of water.

8. The method of claim 7 wherein the frame and the means for connecting the frame to a pile have a plurality of attachment points configured for attachment of lowering means to the apparatus such that the apparatus can be lowered into a body of water.

9. The method of claim 8 having the additional step of lowering the apparatus into a body of water such that the frame is resting on the bottom surface of the body of water;

whereby when the cutting device is actuated, the cutting device moves at an angle downward through the material surrounding the pile and cuts through the pile at a point below the bottom surface.

10. The method of claim 8 wherein the lowering means are attached to the apparatus, and the end of the lowering means that is not attached to apparatus is secured to a buoyant object.

11. The method of claim 7 wherein the cutting device is a pressure medium actuated cutting device, and the method has the additional step of connecting the cutting device to a pump.

* * * * *